(12) United States Patent
Norton et al.

(10) Patent No.: US 11,430,345 B2
(45) Date of Patent: Aug. 30, 2022

(54) WOODEN SPELLER TOY

(71) Applicants: Cynthia Carol Norton, Gladstone, OR (US); Thomas Michael Norton, Gladstone, OR (US)

(72) Inventors: Cynthia Carol Norton, Gladstone, OR (US); Thomas Michael Norton, Gladstone, OR (US)

(*) Notice: Subject to any disclaimer, the term of this patent is extended or adjusted under 35 U.S.C. 154(b) by 175 days.

(21) Appl. No.: 17/095,721

(22) Filed: Nov. 11, 2020

(65) Prior Publication Data

US 2022/0148447 A1 May 12, 2022

(51) Int. Cl.
| | |
|---|---|
| *G09B 25/00* | (2006.01) |
| *G09B 1/16* | (2006.01) |
| *G09B 19/00* | (2006.01) |
| *G09B 1/30* | (2006.01) |

(52) U.S. Cl.
CPC ............. *G09B 1/16* (2013.01); *G09B 1/30* (2013.01); *G09B 19/00* (2013.01)

(58) Field of Classification Search
None
See application file for complete search history.

(56) References Cited

U.S. PATENT DOCUMENTS

| | | | | |
|---|---|---|---|---|
| 754,724 | A | * | 3/1904 | Van Putten ............. A63F 9/088 273/155 |
| 2,155,939 | A | | 1/1937 | Gruden |
| 3,010,227 | A | * | 11/1961 | Glass ...................... A63H 3/16 446/297 |
| 3,422,549 | A | | 1/1969 | Grangaard |
| 4,146,978 | A | * | 4/1979 | Breslow ................. G09B 17/00 446/236 |
| 9,770,637 | B2 | | 9/2017 | Cranford |
| 9,911,347 | B2 | * | 3/2018 | Dore ......................... G09B 1/16 |
| 2006/0040242 | A1 | | 2/2006 | Mejia |
| 2008/0311546 | A1 | | 12/2008 | Wang |

* cited by examiner

*Primary Examiner* — Sunit Pandya
(74) *Attorney, Agent, or Firm* — Donald Debelak

(57) ABSTRACT

The present disclosure is a toy that has hexagonal rings with letters on each hexagonal side that can be rotated to spell words that are present on cards that the users views, the hexagonal rings are removable and replaceable on a lift bar that fits into opening the vertical supports, to facilitate the rotating of the letters the inner hexagonal ring is offset from the letters on the outer ring so the letters fall into place, the variety of words that can be spelled are increased with sets of three hexagonal rings, each with their individual colors for their letters, and three sets of cards with words to spell, each with a color corresponding to the color of one of the set of hexagonal rings.

6 Claims, 3 Drawing Sheets

WOODEN SPELLER TOY

FIELD OF INVENTION

This device relates to helping young children learn to spell, specifically by lining up rotatable hexagonal blocks on an activity stand till they match the spelling of a word on a card that is placed on the stand.

BACKGROUND

Three of the more popular methods for learning to spell are flash cards, trace copy and recall, and memorization.

Flash cards are index cards, with the words the child is practicing on the front of the card and its definition on the back. Then the child can independently go through the cards by looking at the definition, saying the word out loud and spell it out loud. Children also can interact when a teacher or parent tests them by reading them the definition and have the child say the word out loud and spell it you out loud.

One version of trace, copy and recall folds three columns on a piece of paper, and labels one column 'trace', the next column 'copy' and the last column 'recall'. The parent or teacher writes the word in the first column, and has the child trace the letters. Next the child copies the word by looking at what he or she has just written. Finally, the child folds (and hides) the first two columns and recalls the spelling on his or her own as he or she writes the word independently.

Memorizing spelling words is a traditional method that is taught. A parent or teacher shows the child the word written on paper. Then the parent or teacher explains to the child how to visualize a word in her mind. Then the child is instructed to close his or her eyes and picture the word, letter by letter, in her mind. The parent or teacher then asks for the word to be spelled out loud, then asks the child to open her eyes to check if she was correct.

The problem with all these methods is that they are not much fun for the child, but more importantly they give the child little control of the process. What is needed instead is a toy or game, or learning method where the child does have control, and who can act without the guidance of a parent tor teacher.

When Do Kids Learn to Read and Spell? The question "What age do kids learn to read and spell?" doesn't have a simple answer since every child is different, but skills that contribute to literacy later on begin developing as soon as a baby is born. As children learn to communicate and are exposed to books for the first time, they're already reaching key child development milestones for reading.

Studies show that the brain develops quicker than any other time from when a child is born to after they turn three. This is when babies and toddlers pick up basic language skills by building their vocabulary and understanding of grammar. During this period, children build these skills so rapidly that it's considered by many researchers to be one of the most impressive cognitive feats that the brain performs. And by age three, according to many studies, children have usually mastered the basics of their language and continue to learn about 5,000 new words per year. The skills that children learn during these early years and PreK are called metalinguistic skills, or the understanding of their language on a structural level. Without strong metalinguistic skills, children will not pass all the stages of literacy development they need to succeed once they begin school. Oral language and literacy are so tightly connected that, alongside familiarity with books, strengthening one positively affects the other.

Children should know the meanings of the words they spell, and as logical as that sounds—ask a child in your life what this week's spelling words mean, and you might be surprised by their answers.

If spelling words are simply strings of letters to be learnt by heart with no meaning attached and no investigation of how those words are constructed, then we are simply assigning our children a task equivalent to learning ten random seven-digit PINs each week.

That is not only very hard, it's pointless.

When attempting to spell a word, the first question we should teach children to ask is not "what sounds can I hear?" but "what does this word mean?" This gives important information, which helps enormously with the spelling of the word.

Current spelling techniques often have children learning to spell words without any idea of their meaning. There is a need for a game, toy, or learning method that is fun, lets the child be in control, and at, the same time offers the child words to spell, while letting the child know what the word means. The idea behind the toy of this application is to use cards, with a picture and a word to spell, that the child then spells by rotating hexagonal rings, each side with a letter around a post on a stand.

In addition to the different ways of teaching spelling mentioned above there have also been a variety of patents that include games, toys and method. U.S. Pat. No. 2,155,939, Grudin, is a word game that involves tiles with letters and a playing board, where tiles are arranged into words. U.S. Pat. No. 3,432,549, Grangaard, is a spelling and reading aid which has blocks with letters on them that can be arranged into words. This aid also uses cards with pictures and words, the user then using blocks to spell the same word that is on the card. U.S. Pat. No. 9,770,637 Cranford, is a game that integrates reading and spelling into physical activity using balls with letters on them and a goal in the center of a playing field.

US 20060040242, Meija, is a device for helping people learn to read and write. The device disclosed uses character sets on playing card, where each card has multiple images, and letters, either singular letters or combination of letters to spell the out the words represented by the images. US 20080311546 Wang, is an education building game with spelling cards or other devices on which letters may be placed and images, the user creating words that correspond to the images shown.

How these inventions differ from the toys disclosed here, is that 1, they are targeted at older children than the Wooden Speller Toy, and that none of them have stands with lift bards, where the letters can be rotated to spell a word, and none them use the same type of color coding to select the right set of hexagonal rings with letters to go on the blocks to match up the right letters to spell the images on the colored sets of cards.

SUMMARY

The present disclosure is toy consisting of a stand with, a base that has a slot for holding cards, two vertical supports, a lift bar that extends from one vertical support to the other, hexagonal rings, with one letter on each side, that are positioned on the bar and may be rotated. A key to the toy is that the inner hexagonal ring, the part of the invention that is placed over the lift bar, has its hexagonal shape offset from the hexagonal shape on the outer rim of the hexagonal ring, so that letters flop quickly into place when spelling a word. The hexagonal rings come in sets, with each set having one individual color, with each color having a corresponding set of cards with letters with a word spelled out in the same color, with the cards showing and image. The toy is played with the same color being present on both the letters on the cards and the letters on the hexagonal rings. The goal for the users is to rotate the hexagonal rings so that the same letters with the same color that are on the cards are positioned in the same order on the bar. The preferred embodiment in this application is having three sets of cards, with each card in the set having the same color, and three sets of hexagonal rings, with each of the sets of the cards having a corresponding set of the same color cards.

In addition to helping children learn to spell this toy is also good for hand/eye coordination and fine motor skills. With young children getting so much screen time these days it can hinder early learning development that is critical.

The preferred embodiment of this invention has three rotatable hexagonal rings positioned on the bar, with three sets of cards and three sets of hexagonal rings. The number can change, with other embodiments using four or more hexagonal rings, and four or more sets of cards with each set of cards with the letters in one color, having a corresponding set of rings with the same colors.

BRIEF DESCRIPTION OF THE NUMBERS IN THE DRAWINGS 1. stand base
2. slot for cards on stand base to hold cards
3. vertical supports
4. open holders that the lift bar sits in
5. lift bar
6. slots in lift bar to fit into vertical supports
7. hexagonal rings with letters on each surface
8. inner hexagonal ring of the hexagonal rings with offset from outer rings hexagonal shapes
9. letters on hexagonal rings
10. cards
11. card pack
12. card resting pit

DETAILED DESCRIPTION

Figure 1:
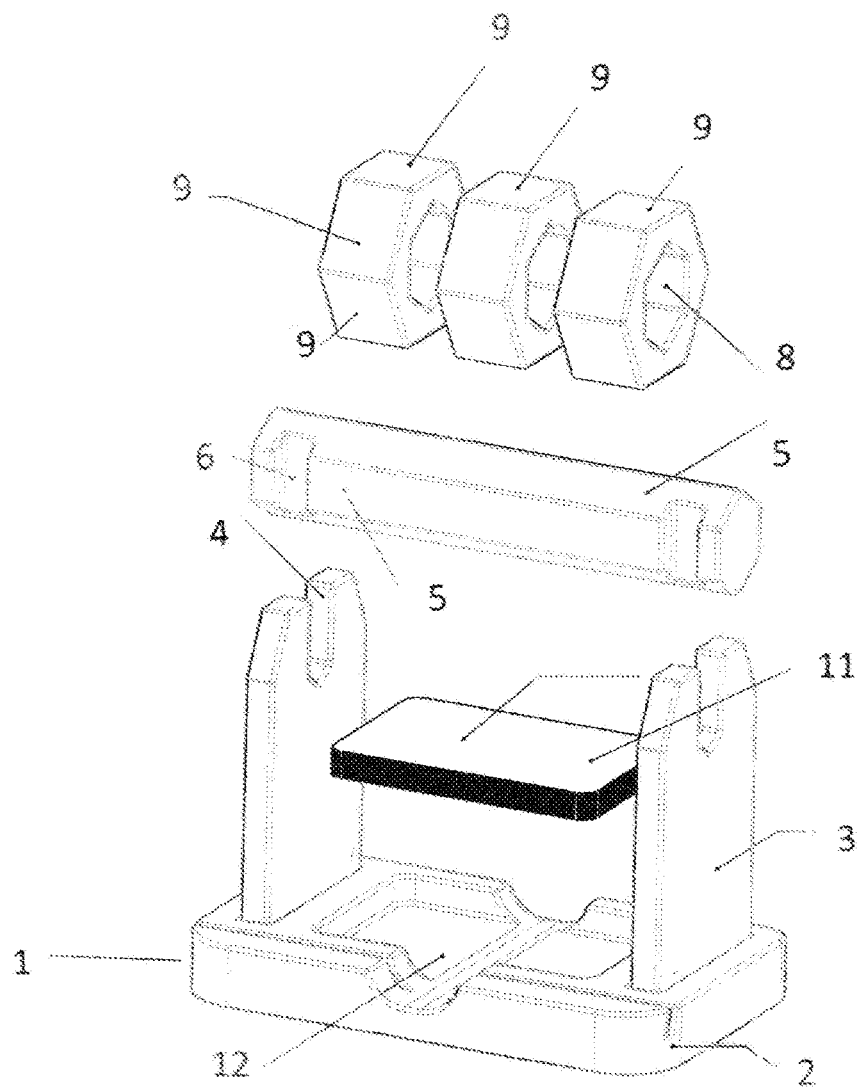
FIG. 1 shows the base of the toy, the upright supports with the slot for the cards in front, the card resting pit, the openings for the lift bar, the slots on the lift bar for holding the lift bar in place, as well as the hexagonal rings, which also demonstrate the offset of the inner and outer hexagonal shapes of the hexagonal rings which have letter on each surface are offset, which allows the ring to rotate quickly into place when a user wants to set a let for spelling a word.

FIG. 1 shows base 1, the offset of between the inner hexagonal ring 8 and hexagonal ring with letters 9 on each surface, as well as the lift bar 5, the vertical supports 3 with openings 4 that hold the lift bar in an elevated position, the slots in the lift bar 6 that hold the lift bar in position when the toy is in use, the hexagonal rings with letters on each side 9 the slot in the front, the card resting pit 12 for holding cards not in use the slot 2 on the base 1 which holds the card for which the user tries to match the spelling on the card.

Figure 2:
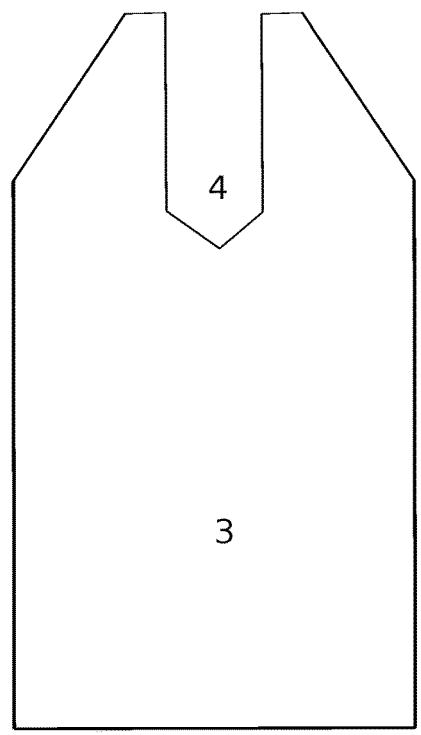
FIG. 2 shows the opening for the lift bar on the vertical supports.

FIG. 2 shows the vertical supports 3. On the top of the vertical supports the openings 4 for holding the lift bar are shown.

Figure 3:
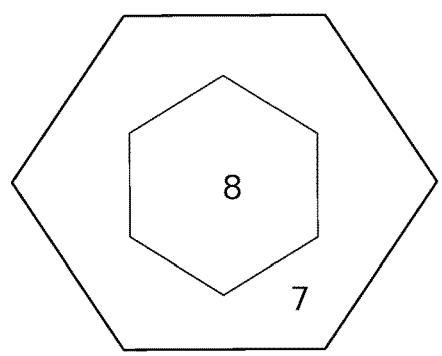
FIG. 3 shows how the inner hexagonal opening on the inner part of the hexagonal ring is offset from the outer ring allowing the letters to rotate smoothly into place.
Figure 4:
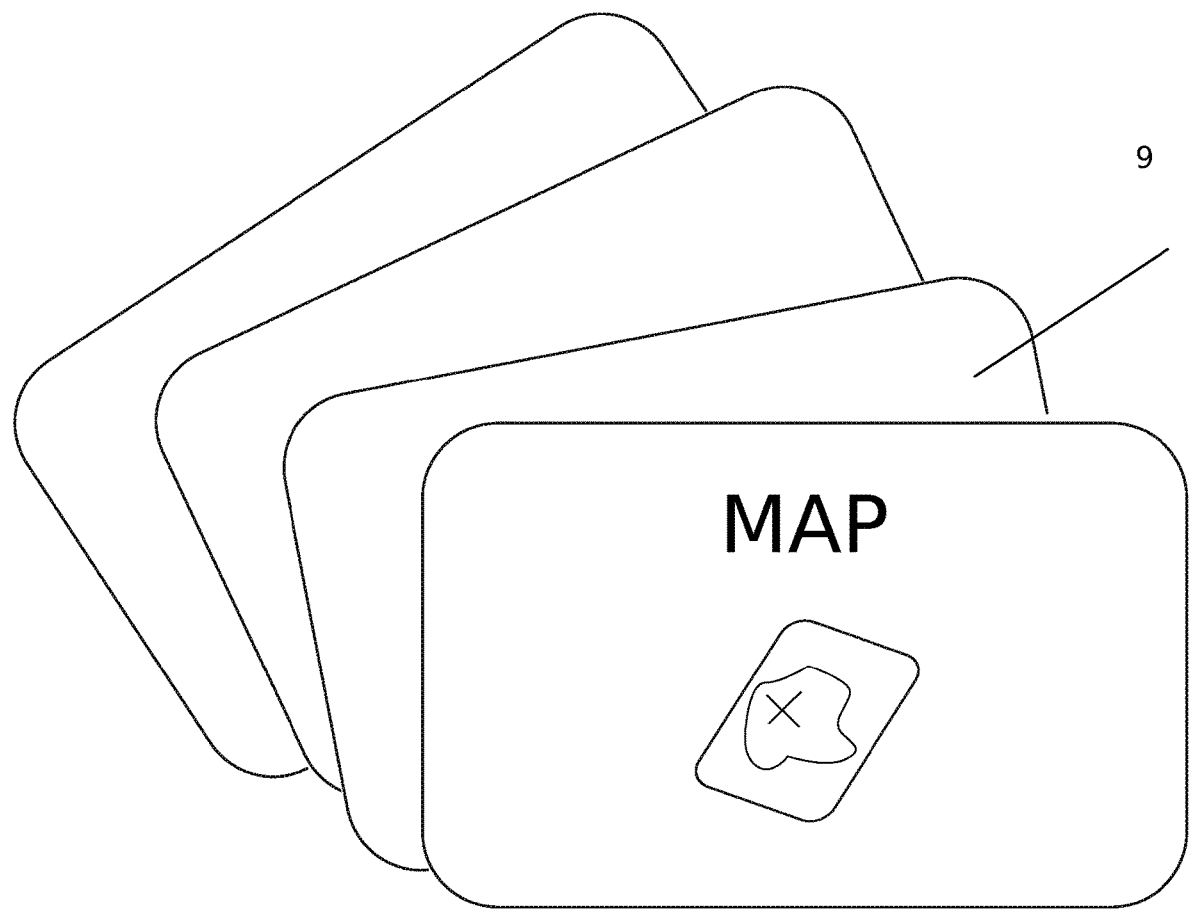
FIG. 4 shows the cards that the user places in the vertical slot for the user to match the spelling with the hexagonal rings.

FIG. 3 shows the offset of the two hexagonal features, the outer rim of the hexagonal ring 7 and the inner hexagonal opening 8 of the hexagonal ring FIG. 4 shows the set of cards 10 that are used to select words to spell.

We claim:

1. A toy comprising:
a base;
a card slot in the base to hold cards;
two vertical supports;
open holders in the top of the vertical supports;
a lift bar that fits into and is easily removed from the open holders;
the lift bar having two slots each engaging one side of the vertical support opening;
hexagon rings holding letters on each side that fit over the lift bar;
each hexagonal ring having a letter on each side, six in total;
the horizontal rings having an offset between the inner ring hexagonal shape and the outer rim hexagonal shape;
three hexagonal rings fit on the lift bar between the vertical supports;
a set hexagon rings having letters of one color;
a second set hexagon rings having letters of a second color;
a third set hexagon rings having letters of a third color;
three sets cards with pictures and the spelling of a word depicted in the picture;
a first set of cards having the words spelled with letters of one color, corresponding to the color of the first set of hexagonal rings;
a second set of cards having the words spelled with letters of one color, corresponding to the color of the second set of hexagonal rings;
a third set of cards having the words spelled with letters of one color, corresponding to the color of the third set of hexagonal rings.

2. The toy of claim 1 where the lift bar has a hexagonal shape.

3. The toy of claim 1 with a configuration that may hold an additional number of hexagonal rings.

4. The toy of claim 1, with cards that have more than three letters.

5. The toy of claim 1 where there are additional sets of hexagonal rings, with colors that are unique to that set of rings.

6. The toy of claim 1 where there are additional sets of cards, with colors that are unique to that set of cards, but that correspond to a color of a set of hexagonal rings.

* * * * *